United States Patent
Bednarek et al.

[11] Patent Number: 5,927,381
[45] Date of Patent: Jul. 27, 1999

[54] VEHICLE HEATER

[75] Inventors: Henryk Bednarek, Landsberg/Lech; Peter Blueher, Oberhaching; Berthold Wagner, Fuerstenfeldbruck; Horst Kazenwadel, Munich, all of Germany

[73] Assignee: Bayerische Motoren Werke Aktiengesellschaft, Munich, Germany

[21] Appl. No.: 08/817,485

[22] PCT Filed: Sep. 21, 1995

[86] PCT No.: PCT/EP95/03711

§ 371 Date: Apr. 9, 1997

§ 102(e) Date: Apr. 9, 1997

[87] PCT Pub. No.: WO96/15920

PCT Pub. Date: May 30, 1996

[30] Foreign Application Priority Data

Nov. 21, 1994 [DE] Germany ............................. 44 41 352

[51] Int. Cl.$^6$ .......................................................... F28F 1/00
[52] U.S. Cl. ................... 165/41; 165/42; 165/43; 165/10; 237/12.3 B; 123/142.5 R
[58] Field of Search ................... 165/42, 43, 10, 165/10 A; 237/12.3 B; 123/142.5 R

[56] References Cited

U.S. PATENT DOCUMENTS

| | | | |
|---|---|---|---|
| 4,140,173 | 2/1979 | Wulf et al. | 165/10 A |
| 4,556,171 | 12/1985 | Fukami et al. | 165/43 |
| 4,653,729 | 3/1987 | Ando | 165/42 |
| 4,972,901 | 11/1990 | Hormansdorfer | 165/10 A |
| 5,211,334 | 5/1993 | Schatz | 165/10 A |
| 5,277,038 | 1/1994 | Carr | 165/42 |
| 5,407,130 | 4/1995 | Uyeki et al. | 165/42 |

FOREIGN PATENT DOCUMENTS

| | | | |
|---|---|---|---|
| 0 214 517 | 3/1987 | European Pat. Off. . | |
| 0 340 621 | 11/1989 | European Pat. Off. . | |
| 340-621 | 11/1989 | European Pat. Off. | 165/42 |
| 524656 | 1/1993 | European Pat. Off. | 165/42 |
| 2 593 122 | 7/1987 | France . | |
| 32 04 519 | 5/1983 | Germany . | |
| 32 06 239 | 9/1983 | Germany . | |
| 3245-026 | 6/1984 | Germany | 165/10 A |
| 3819-223 | 12/1988 | Germany | 165/10 A |
| 1544-595 | 2/1990 | Germany | 165/42 |
| 4100193 | 7/1992 | Germany | 165/10 A |
| 1-90994 | 4/1989 | Japan | 165/10 A |
| 1 546 295 | 2/1990 | U.S.S.R. . | |

*Primary Examiner*—Ira S. Lazarus
*Assistant Examiner*—Terrell McKinnon
*Attorney, Agent, or Firm*—Evenson, McKeown, Edwards & Lenahan, P.L.L.C.

[57] ABSTRACT

In order to house a latent heat storage device in a vehicle in a manner which saves as much space as possible and at a site which is secured against accident-caused deformations, the latent heat storage device is installed in the passenger compartment in the area of the front passenger's foot space.

16 Claims, 4 Drawing Sheets

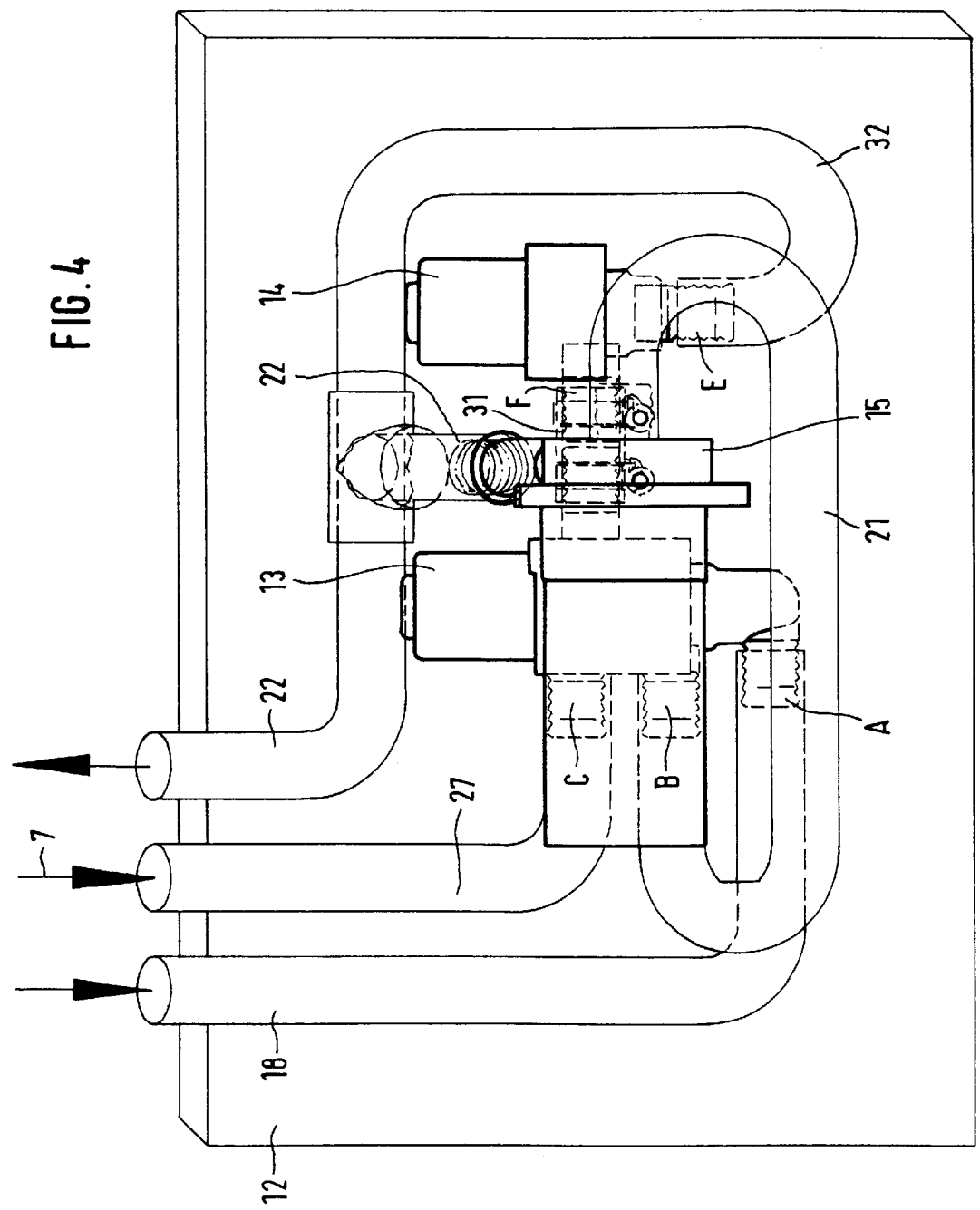

VEHICLE HEATER

BACKGROUND AND SUMMARY OF THE INVENTION

The invention relates to a vehicle heater and, more particularly, to a vehicle heater for a vehicle equipped with a liquid-cooled internal-combustion engine. A heating circulating system has a heater heat exchanger through which a liquid flows. The heat exchanger is arranged in a passenger compartment and is connected by way of a forward flow pipe and a return flow pipe with the cooling circulating system of an internal combustion engine. A latent heat storage device such as a so-called "PCM device" (phase change material which stores heat) can be switched into the heating circuit. The liquid circulation takes place through the heat exchanger and the latent heat storage device by way of a circulating pump which can be driven independently of the engine and by switch-over valves.

From European Patent document EP-B 340 621, an internal-combustion engine is known which has a heating circulating system into which a latent heat storage device can be switched by means of corresponding switching valves. The latent heat storage device is filled with a salt as a storage medium which, in the case of a phase change from solid to liquid, is capable of storing heat for several days so long as the latent heat storage device housing is constructed in a correspondingly insulated manner.

The arrangement known from European Patent document EP-B 0 340 621 has the purpose of heating the passenger compartment independently of the engine; thus, it is virtually a replacement for the known fuel operated auxiliary heater.

In order to be able to store a corresponding amount of heat, which is sufficient to heat a passenger compartment of a motor vehicle also at outside temperatures of −20° C., to such an extent that at least the windshield is free of condensation, a storage volume of over 10 l is required. The latent heat storage device must be constructed to be correspondingly large.

From *Automotive Engineering*, February 1992, Pages 58–61, it is known to provide a latent heat storage device with a cylindrical housing and to install this latent heat storage device in the engine compartment.

In the case of a crash, this installation site is disadvantageous because in motor vehicles specifically the forward structure is designed to be relatively soft for the purpose of absorbing energy. In addition, because of the large number of installed assemblies, sufficient space is rarely available in the engine compartment.

From German Patent document DE-A 32 04 519, it is known to house a vacuum reservoir in a motor vehicle in the front passenger's foot space, specifically such that it can be used as a foot rest. Nothing is indicated in this reference concerning the fastening and guiding of the pipes. A leaking of the vacuum reservoir, or of the vacuum pipe, in the case of a crash does not present any problems because the medium cannot flow out of the two devices into the foot space which may otherwise result in injuries in the front passenger's foot/leg space.

In addition to a suitable installation site for a latent heat storage device of the above-mentioned type, there is also needed a type of fastening which is favorable in the event of a crash.

According to the invention, these needs are met by a vehicle heater for a vehicle equipped with a liquid-cooled internal-combustion engine. A heating circulating system has a heater heat exchanger through which a liquid flows. The heat exchanger is arranged in a passenger compartment and is connected by way of a forward flow pipe and a return flow pipe with the cooling circulating system of an internal combustion engine. A latent heat storage device can be switched into the heating circuit. The liquid circulation takes place through the heat exchanger and the latent heat storage device by way of a circulating pump which can be driven independently of the engine and by switch-over valves. The latent heat storage device is installed in the passenger compartment in the area of the front passenger's foot space. The latent heat storage device is held in its position by way of a fastening strap. The forward flow pipe and the return flow pipe for the coolant are arranged laterally on the latent heat storage device by way of couplings.

In addition to the fact that the foot space area on the front passenger side in the case of a crash is not subjected to such intensive deformation as the vehicle forward structure, this installation site has the advantage that, independently of the vehicle type, essentially the same installing conditions will always exist so that an extremely small number of different external forms of latent heat storage devices will suffice for a large number of vehicles. As a result, higher piece numbers are achieved so that the piece-number-dependent manufacturing costs can be significantly reduced. Because a tightening strap for fastening the latent heat storage device is provided, in the case of a deformation of the front wall in this area, it is achieved that the latent heat storage device can escape this deformation because it is no longer connected at several points with the front wall or the floor panel. Thus, it is also possible that the forward flow and return flow pipes of the coolant, in the case of a correspondingly led length, can go along in the escaping of the latent heat storage device without tearing. Because of the also suggested lateral mounting of the two pipes, the pipes extending in the vehicle can be connected with the latent heat storage device by way of a pipe coupling which is designed such that, although the pipes are connected in a liquid-tight manner, they can rotate when subjected to forces which may be released in the case of a crash without any opening of the coupling or tearing-off of the pipes in the coupling. This therefore reliably prevents hot coolant from flowing out into the front passenger's foot space in the case of a crash which otherwise would result in a scaling/burning of the front passenger's feet/legs.

A further development according to the invention has the advantage that the latent heat storage device itself can be used directly as a surface for placing the front passenger's feet. Naturally, for reasons of safety, a step protection plate may be provided between the exterior housing of the latent heat storage device and the normally existing carpet floor in the foot space. However, it is also possible to place the carpet floor directly on the exterior side of the latent heat storage device.

An advantageous design layout for the course of the pipes is also provided. It is also advantageous that additional switching elements, which are required for connecting the latent heat storage device to the heating circulating system according to European Patent Document EP-B 0 340 621, can be mounted on the body shell in a preassembled manner.

In the following, the invention will be explained in detail by means of a preferred embodiment.

BRIEF DESCRIPTION OF THE DRAWINGS

FIG. 4 is a schematic view of an arrangement of the assembly carrier.

DETAILED DESCRIPTION OF THE DRAWINGS

Figure 1:
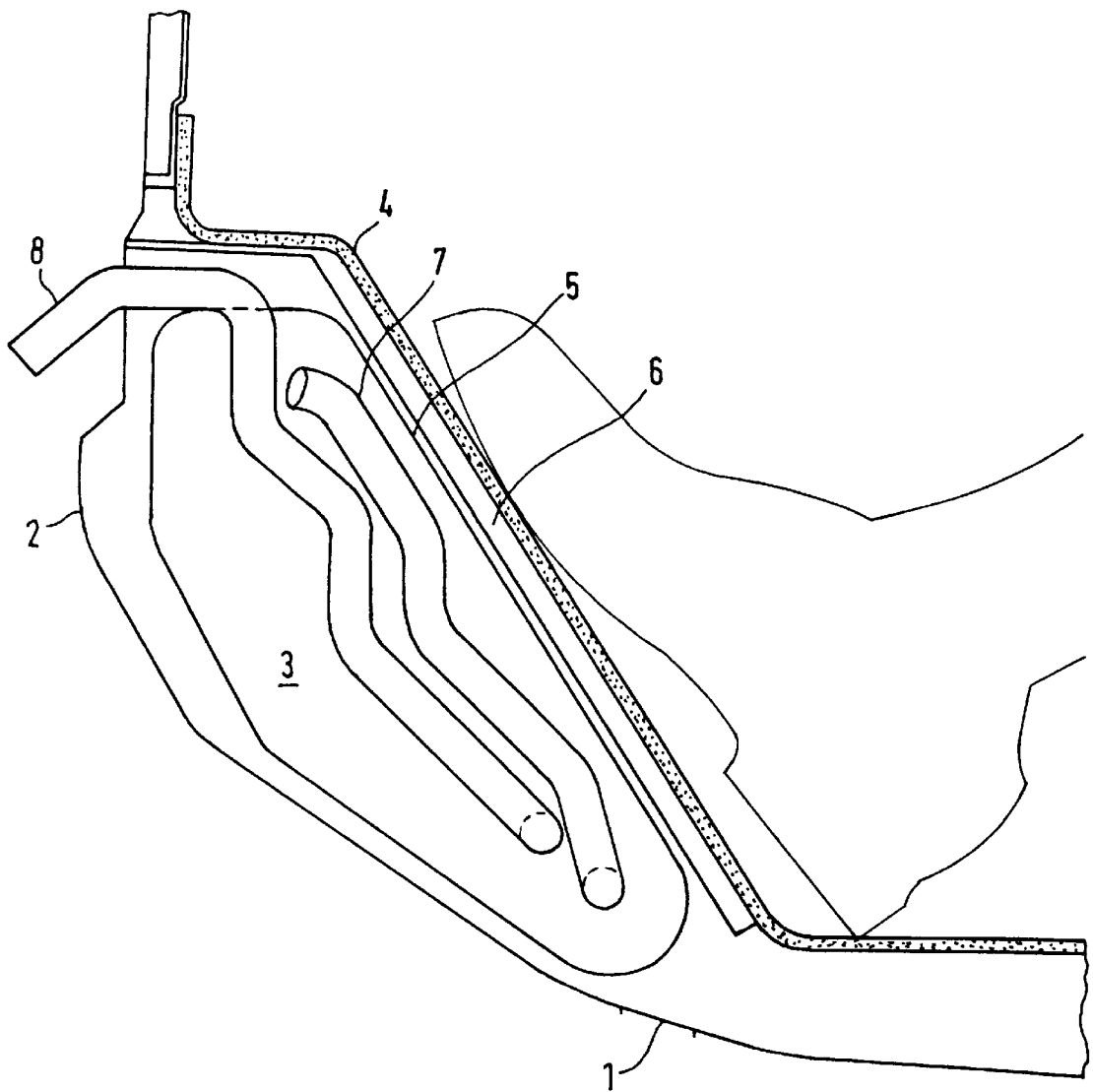
FIG. 1 is a schematic cross-sectional view of a front-passenger-side foot space.

FIG. 1 is a schematic longitudinal sectional view of the forward area of the foot space of a motor vehicle passenger compartment. In this case, the floor panel has reference number 1; the front wall has reference number 2; a latent heat storage device has reference number 3; and a carpet floor has reference number 4. As a rule, the front wall 2 does not extend perpendicularly to the floor panel but diagonally in the transition area. Also as a rule, the forward foot space does not follow the course of the front wall and of the floor panel but is designed at an angle of usually 45° as a foot rest in this area. The deviation between the course of the front wall or of the floor panel and the desired course of the foot space in this area is achieved either by way of a foamed-material wedge or by way of a separate cover plate behind which a hollow space will then be formed.

According to the invention, instead of using the foamed-material wedge or the cover plate, the latent heat storage device 3 is housed in this area of the foot space. In the cross-sectional view, it therefore has a flat base side 5 which, possibly by means of a step protection device 6, is covered directly by the carpet floor 4. The other lateral surfaces of the latent heat storage device 3 are adapted to the course of the floor panel and of the front wall 2. It is therefore possible to house latent heat storage devices with a volume of from 10 to 13 l in the front passenger's foot space without any problem. In this case, the foot space available to the front passenger is only insignificantly reduced.

By means of a forward flow pipe 7 and a return flow pipe 8, the latent heat storage device 3 is connected to the heating circulation system. The two pipes 7, 8 cause the storage of heat on the side facing the longitudinal axis of the vehicle.

Figure 2:
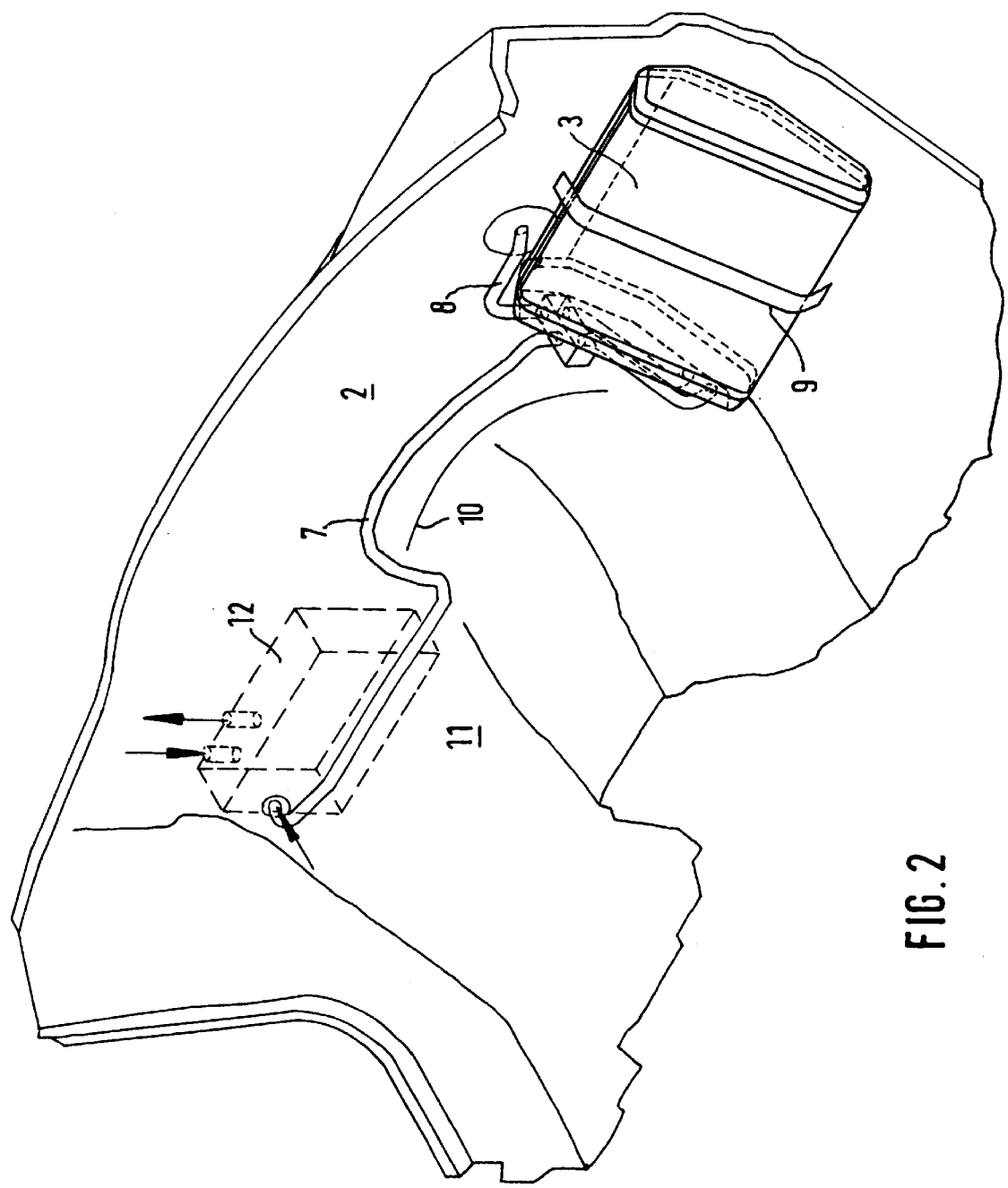
FIG. 2 is a schematic perspective view of a vehicle front end.

FIG. 2 is a perspective view of a forward passenger car foot space illustrating the position of the latent heat storage device 3 as well as the course of the forward flow pipe 7 and of the return flow pipe 8.

The latent heat storage device 3 is held in the foot space by means of a fastening strap 9 extending in the center. Just above the latent heat storage device, the return flow pipe 8 passes through an opening in the front wall into the engine compartment. By contrast, the forward flow pipe 7 is guided around by way of the schematically indicated cardan tunnel 10 and penetrates the front wall 2 in the driver-side foot space 11.

On the driver-side forward side of the front wall 2, the forward left wheel house is situated. An assembly carrier 12 is arranged here which carries two electrically controllable switching valves 13 and 14 as well as an electrically drivable circulating pump 15 (FIG. 4). The forward flow pipe 7 is connected with this assembly carrier 12 (FIG. 4).

Figure 3:
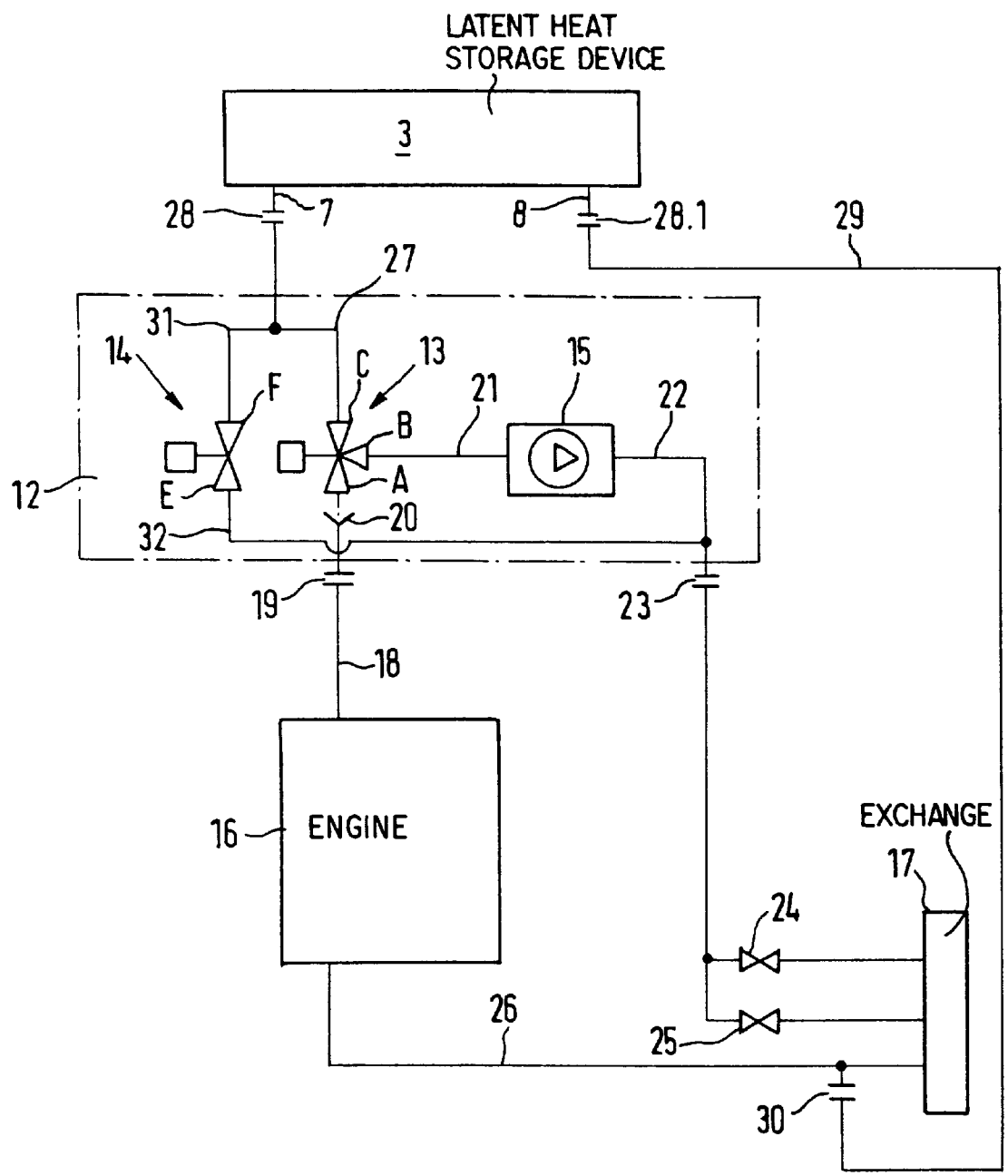
FIG. 3 is a schematic view of a heating circulation system.

FIG. 3 is a schematic diagram of the heating circulating system and the individual assemblies of the assembly carrier 12. In this case, the internal-combustion engine supplying the heat has the reference number 16 and the heat exchanger of the heater for the passenger compartment has the reference number 17.

As illustrated in FIGS. 3 and 4, all connection pipes between the valves 13 and 14 as well as the circulating pump 15 are arranged on the assembly carrier 12.

A hose pipe 18 for coolant heated in the internal-combustion engine 16 leads from the internal-combustion engine 16 via a hose coupling 19 and a return valve 20 to the connection A of the valve constructed as a 3-way valve. Naturally, it is also possible to constructionally integrate the return valve 20 into the valve 13. At the connection B of this valve, the suction pipe 21 is arranged which leads to the inlet of the circulating pump 15. The delivery pipe 22 of the circulating pump 15 leads by means of another hose coupling 23 to the two heater valves 24 and 25 and then farther to the heat exchanger 17 of the heater.

From the heat exchanger 17 of the heater, a return flow pipe 26 leads back to the internal-combustion engine 16.

A pipe 27, which is connected by means of a hose coupling 28 with the latent heat storage device 3 by way of its forward flow pipe 7, is connected to the connection C of the valve 13. By way of the return flow pipe 8, another hose coupling 28.1 and a pipe 29, the latent heat storage device 3 is connected with the return flow pipe 26 also by means of a hose coupling 30.

The valve 14 is constructed as a 2-way valve. It is connected on the assembly carrier 12 by way of a pipe 31 with the pipe 27 and, on the other side, is connected by way of a bypass pipe 32 with the delivery pipe 22. The corresponding valve connections of the valve 14 are marked E and F.

For heating the passenger compartment when the internal-combustion engine 16 is stopped and the latent heat storage device 3 is charged, the heater valves 24 and 25 are opened; the valve 14 is closed; and the valve 13 is switched through from connection C to connection B. Connection A is also blocked.

When the circulating pump 15 is switched on at these valve positions, hot coolant is transported from the latent heat storage device 3 by way of the pipes 7 and 27, the connection C, the connection B and the pipe 21, to the circulating pump 15. From there, it flows through the pipe 22 by way of the heater valves 24 and 25 into the heater heat exchanger 17 from which the heat is delivered to the passenger compartment in a manner known per se. From the heater heat exchanger 17, the now cooled coolant is returned by way of the pipe 26 and the pipes 29 and 8 to the latent heat storage device 3 in order to again absorb heat there.

When the internal-combustion engine is running and the coolant inside the internal-combustion engine is sufficiently hot, the internal-combustion engine takes over the heat supply to the heater heat exchanger. For this purpose, the valve 13 switches the connection A to the connection B. As a result, coolant heated in the internal-combustion engine 16 can flow by way of the forward flow pipe 18 and the return valve 20 into the pipe 21 and from there to the circulating pump 15. It leaves the circulating pump 15 by way of the pipe 22 and by way of the heater valves 24 and 25 reaches the heat exchanger 17. From there, it flows by way of the return flow pipe 26 back to the internal-combustion engine 16.

As soon as the coolant of the internal-combustion engine 16 delivers more heat to the heater heat exchanger 17 than required for maintaining the temperature in the passenger compartment, the valve 14 is opened. As a result, heated coolant can flow through the bypass pipe 32, the connection E and the connection F of the valve 14 to the pipe 31 and from there farther, by way of the pipe 27 and the forward flow pipe 7 to the latent heat storage device 3. There, the cooled stored mass is heated by the hot coolant. The coolant cooled in the latent heat storage device 3 leaves it by way of the return flow pipes 8 and 29 and reaches the internal-combustion engine 16 by way of the return flow pipe 26.

The electric/electronic control circuit required for controlling the valves and the circulating pump is not described here in detail because its special construction is not an object of the invention.

FIG. 4 is a schematic view of a practical constructional arrangement of the individual assemblies on the assembly carrier 12 as well as of the pipes which, on the one hand, connect the assemblies with one another and, on the other hand, connect the assemblies with the heating circulating system. In this case, identical components have the same reference numbers as in FIG. 3. As shown in this illustration, a very compact construction can be achieved which has relatively short pipe connections.

In the case of the illustrated arrangement, the circulating pump 15 is situated in front of the valve 13 which is partially hidden as a result. The valve 14 is arranged adjacent to the valve 13. Here, the pipe 31 leads directly into the valve 13 which is constructed such that a direct flow to the pipe 27 is ensured. Naturally, the return valve 20 is also integrated in the valve 13.

Furthermore, it is possible to combine the electric connections for the two valves 13, 14 and the circulating pump 15 also to form a central plug so that, in addition to the three pipe connections for the coolant, only one additional central plug must be connected with the assembly carrier 12 in order to establish all connections required for the operation.

We claim:

1. A vehicle heater for a vehicle equipped with a liquid-cooled internal-combustion engine, comprising:

a heating circulating system connected by way of a forward flow pipe and a return flow pipe with a cooling circulating system of the liquid-cooled-internal-combustion engine, said heating circulating system having a heat exchanger through which a liquid flows, arranged in a passenger compartment of the vehicle;

a latent heat storage device switchable into the heating circulating system;

a circulating pump which is drivable independently of the internal-combustion engine, a liquid circulation taking place through the heat exchanger and the latent heat storage device by way of the circulating pump and switch over valves;

wherein said latent heat storage device is installed in an area of a front passenger's foot space in the passenger compartment of the vehicle;

a fastening strap arranged to hold said latent heat storage device in position in the area of the front passenger's foot space; and wherein the forward flow pipe and the return flow pipe for liquid circulation are arranged laterally on the latent heat storage device via couplings.

2. The vehicle heater according to claim 1, wherein said latent heat storage device has a planar base side facing the foot space of the passenger compartment of the vehicle, remaining lateral surfaces of the latent heat storage device being adapted to a course of a front wall of a floor panel of the passenger compartment.

3. The vehicle heater according to claim 1, wherein the return flow pipe is guided in an area of the latent heat storage device through a front wall directly into an engine compartment of the vehicle.

4. The vehicle heater according to claim 2, wherein the return flow pipe is guided in an area of the latent heat storage device through a front wall directly into an engine compartment of the vehicle.

5. The vehicle heater according to claim 1, wherein the forward flow pipe is guided in the passenger compartment over to a driver's side and emerges in the driver's side through an opening in a front wall of the vehicle.

6. The vehicle heater according to claim 2, wherein the forward flow pipe is guided in the passenger compartment over to a driver's side and emerges in the driver's side through an opening in a front wall of the vehicle.

7. The vehicle heater according to claim 3, wherein the forward flow pipe is guided in the passenger compartment over to a driver's side and emerges in the driver's side through an opening in a front wall of the vehicle.

8. The vehicle heater according to claim 1, wherein the forward flow pipe emerges into a wheel house on a driver's side and is there connected with an assembly carrier on which two control valves and the circulating pump are arranged.

9. The vehicle heater according to claim 2, wherein the forward flow pipe emerges into a wheel house on a driver's side and is there connected with an assembly carrier on which two control valves and the circulating pump are arranged.

10. The vehicle heater according to claim 3, wherein the forward flow pipe emerges into a wheel house on a driver's side and is there connected with an assembly carrier on which two control valves and the circulating pump are arranged.

11. The vehicle heater according to claim 5, wherein the forward flow pipe emerges into a wheel house on a driver's side and is there connected with an assembly carrier on which two control valves and the circulating pump are arranged.

12. The vehicle heater according to claim 1, wherein the assembly carrier is clipped to a vehicle body in an area of a wheel house.

13. The vehicle heater according to claim 2, wherein the assembly carrier is clipped to a vehicle body in an area of a wheel house.

14. The vehicle heater according to claim 3, wherein the assembly carrier is clipped to a vehicle body in an area of a wheel house.

15. The vehicle heater according to claim 1, wherein the forward flow and return flow pipes are laterally mounted so as to allow said pipes to rotate when subjected to force.

16. The vehicle heater according to claim 15, wherein said fastening strap is disposed about a center of the latent heat storage device.

* * * * *